July 27, 1937.  C. McDERMOTT  2,088,029
BICYCLE GENERATOR
Filed Sept. 26, 1935   2 Sheets-Sheet 1

CARL McDERMOTT
INVENTOR
BY
ATTORNEY

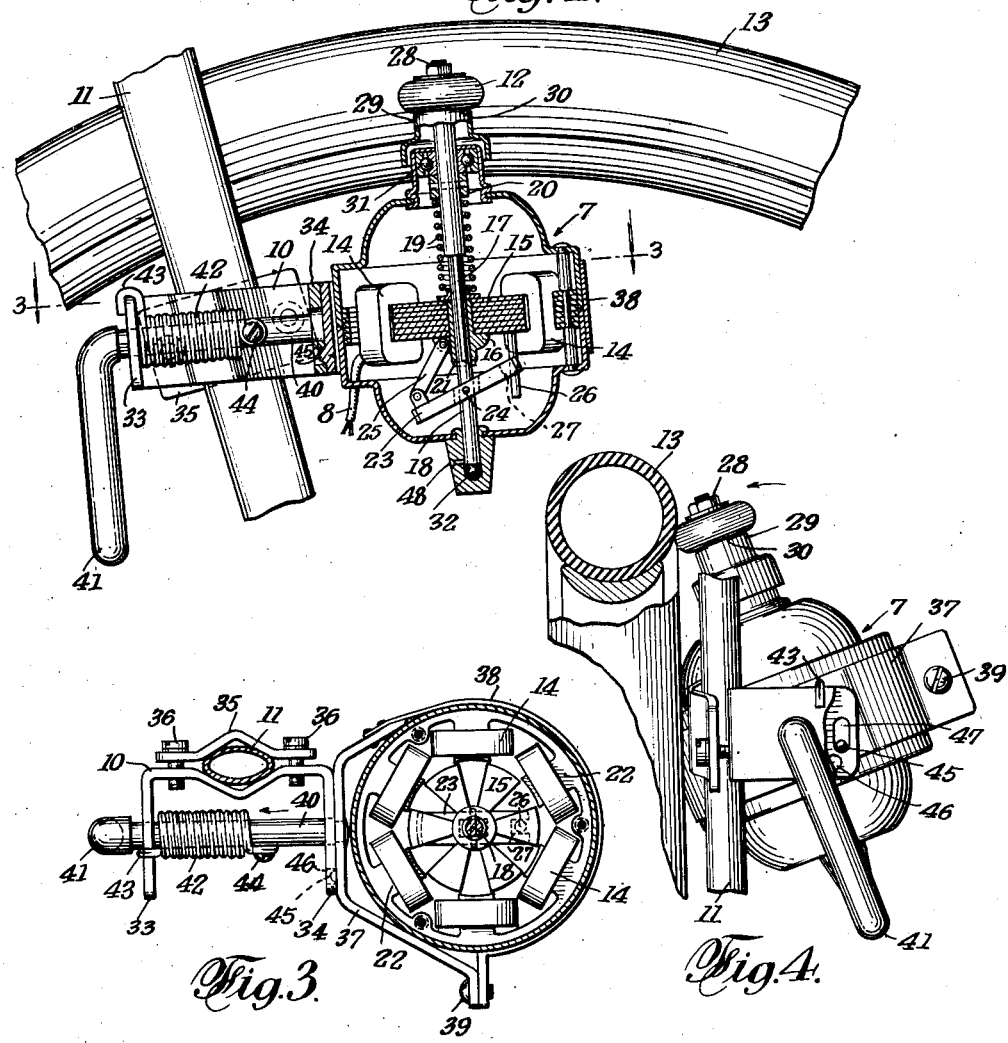

Patented July 27, 1937

2,088,029

UNITED STATES PATENT OFFICE 2,088,029

BICYCLE GENERATOR

Carl McDermott, Freehold, N. J.

Application September 26, 1935, Serial No. 42,223

6 Claims. (Cl. 171—209)

This invention relates to what are known generally as bicycle lights.

Special objects of the invention are to provide a relatively small, light and compact generator, which may be readily mounted in position to be driven by a bicycle wheel, which may be made operative or inoperative at will, which will not be in the way at any time and which, when in use, will provide a lighting current of substantially constant voltage.

Other objects are to provide apparatus of the character disclosed, which will be of particularly simple, practical and efficient design.

Further objects and the novel features of construction, combinations and relations of parts by which the objects of this invention are attained will appear in the course of the following specification.

The drawings accompanying and forming part of the specification illustrate one of the practical commercial embodiments of the invention, but it is to be understood that the actual physical structure may vary in different respects, all within the true intent and broad scope of the invention.

Fig. 2 is a broken part sectional view of the generator and mounting bracket.

Fig. 3 is a horizontal sectional view taken on substantially the plane of line 3—3 of Fig. 2.

Fig. 4 is a broken rear elevation showing the generator rocked into yielding driven engagement with the bicycle tire.

Figure 1:
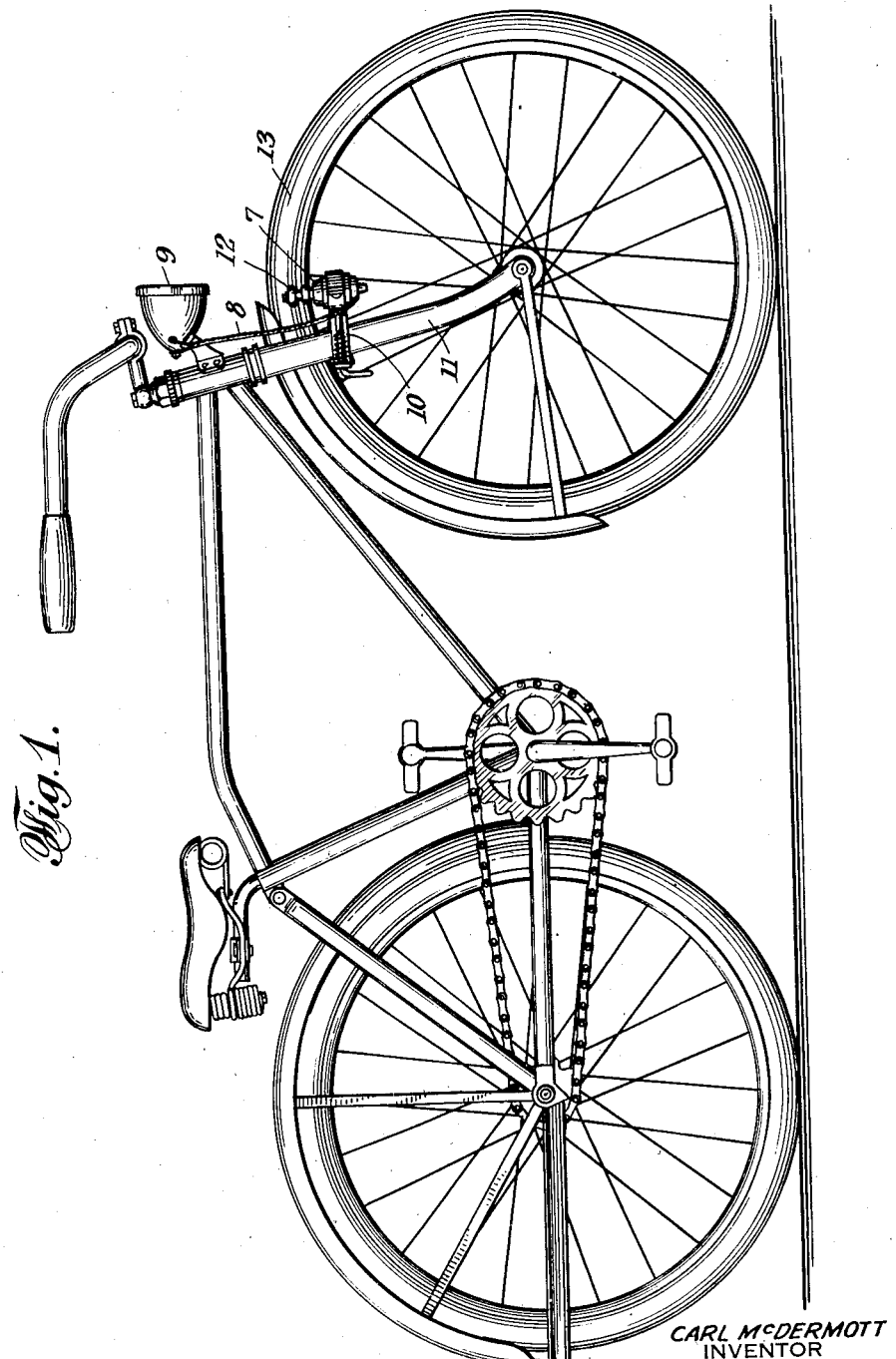
Fig. 1 is a side elevation showing the invention applied to an ordinary bicycle.

In the general view, Fig. 1, the generator is indicated at 7, connected by wiring 8, with the lamp 9, and rockably mounted in a bracket 10, clamped to the front wheel fork 11, in position such that the rubber pinion 12, on the generator shaft may be engaged with the front tire 13.

As shown particularly in Figs. 2 and 3, the generator consists of a set of field magnets 14, and a cooperating armature 15, the latter comprising a group of permanently magnetized discs on a hub 16, slidingly keyed at 17, on the shaft 18.

This armature assembly is acted on by a coiled spring 19, interposed between one side of the armature and a fixed thrust collar 20.

Movement of the armature under pressure of the spring 19 is limited by a stop pin 21, to a position where the armature discs are in full alignment with the field magnet discs 22.

To maintain substantially constant voltage, a governor mechanism is provided to shift the armature on the shaft out of its centered position in the magnetic field, more or less proportionately with increase in speed of rotation.

The governor illustrated, consists of a single weight in the form of a bar 23, pivoted transversely on the shaft at 24, and connected with the hub of the armature by a pivoted thrust link 25.

The parts are so designed and arranged that with the armature in the maximum field position, with the spring 19 holding it against the stop pin 21, the governor weight 23, will be tilted at an incline, such as shown in full lines, Fig. 2, so that with increase of speed in endeavoring to reach a position at right angles to the shaft, it will push the armature through the thrust link 25, further and further up out of the maximum field position.

The generator is made as small, compact and light as possible. The armature shaft for one part, therefore is quite small in diameter. The governor weight, to be effective, is fairly heavy and if the pivot pin 24 for the same were heavy enough to carry the rotative load, such pin would be of a size to almost cut the small shaft in two. To overcome this difficulty, the pivot pin 24 is made relatively small as indicated, of sufficient size only to carry the pivotal load of the governor weight and the rotative or twisting load is taken care of by a sliding drive connection between the armature and the governor weight. This sliding connection in the simple form shown, consists of a pin 26, projecting from the lower face of the armature engaging in a slot 27, in the adjacent end of the governor bar. This slot thus provides a shoulder against which the driven pin 26, may engage, thus taking the rotative load off the small pivot pin 24. The armature by means of its key 17, on the shaft, is fully capable of carrying this extra load of driving the governor bar.

The spring 19 may be a light one, since this acts downwardly with the weight of the armature.

The generator drive pinion 12, is shown as fixed by means of a clamp nut 28, on the upper screw-threaded end of the shaft against a bell-shaped sleeve or thimble 29, which abuts the shoulder 30, above the upper shaft bearing 31. This thimble thus serves also as a guard or cover over the upper bearing. The shaft is shown as journalled at its lower end in a combination radial and thrust bearing 32.

The mounting bracket 10, is shown as constructed with spaced substantially parallel arms 33, 34, Fig. 3 and this bracket is shown as adjustably held to the front fork by a clamp plate 35, secured to the back of the bracket by screws 36.

The generator is shown as secured in a yoke 37, by a surrounding flexible band 38, adjustably secured by screw 39. This construction permits a certain amount of up and down adjustment of the generator without changing the position of the supporting bracket on the fork and the entire detachment of the generator, if changes or other adjustments are necessary.

The generator carrying yoke is shown as fixed on the forward end of a shaft 40, pivotally and slidably mounted in the bracket arms 33, 34, and this shaft is illustrated as having a downwardly angled handle portion 41, at the opposite end, by which the shaft may be rocked one way or the other.

A coiled tension spring 42, anchored at one end at 43, to the bracket arm 33, and at the opposite end to the shaft at 44, exerts tension to draw the rock shaft rearwardly and to rotate it in a left-handed direction, Fig. 4, that is, so as to yieldingly hold the driving pinion engaged with the tire.

For securing the generator in the disengaged inoperative position, interlocking elements are provided on the back of the yoke and the adjoining face of the bracket arm 34, these being illustrated as a rounded or conical projection 45, on the yoke and a seat 46, on the bracket arm. These parts interlock under the pull of the spring 42, as in Fig. 3, to hold the generator in the upright position disengaged from the tire, but this spring will yield to a turning force applied to the handle 41, to rotate the holding lug 45, out of socket 46, as in Fig. 4. In this latter position, the lug 45 may enter a clearance slot 47, in the bracket arm 34, to leave the spring free to rock the generator in yielding driven engagement with the tire.

The handle 41 may be constructed as a "kick lever" readily engageable by the foot of the rider to snap the generator either into operative or inoperative position, where it will be yieldingly held by the spring.

The rotor or armature 15, as it has heretofore been termed, may be of the multi-polar disc design shown in Fig. 3, cooperating with the stationary poles 22, to a varying extent, depending upon the speed of rotation, the governor automatically determining the extent of magnetic coupling to maintain a substantially constant voltage in the magnet coils 14. This automatic regulation in commercial examples of the invention, may be so close as to maintain a generator voltage of 2.6 volts at speeds varying from 5 to 50 miles per hour. Thus a substantially constant light may be provided at all usual speeds and with no under illumination, or burning out of lamps from excessive voltage.

The lower combination radial-thrust bearing 32, is indicated as having a suitable lubricator 48.

What is claimed is:

1. A bicycle generator comprising stationary field coils and rotating permanent magnet armature, a shaft on which said armature is slidingly keyed, a tire engaging element on said shaft, a governor weight pivoted on said shaft and having a connection with said armature at one side of the shaft for shifting the latter on the shaft in respect to the stationary field coils and a slidable driving connection from said armature to said pivotal governor weight at the opposite side of the shaft.

2. A bicycle generator comprising stationary field coils and rotating permanent magnet armature, a shaft on which said armature is slidingly keyed, a tire engaging element on said shaft, a governor weight pivoted on said shaft and having a connection with said armature for shifting the latter on the shaft in respect to the stationary field coils, a slidable driving connection from said armature to said pivotal governor weight, a rocking mounting for said generator including spring means rocking the generator to carry said tire engaging element in a tire engaging direction, and means to retain the generator in a position clear of the tire.

3. A bicycle generator comprising stationary field coils and a rotating permanent magnet armature, a shaft on which said armature is slidingly keyed, a tire engaging element on said shaft, a governor weight pivoted on said shaft and having a connection with said armature for shifting the latter on the shaft in respect to the stationary field coils, a slidable driving connection from said armature to said pivoted governor weight, including a drive pin on the armature and a shoulder on the governor weight slidably engaging said pin.

4. In a bicycle generator, a clamp for engagement on a bicycle front fork, said clamp having spaced arms, a rock shaft slidably journaled in said arms, a turn handle on one end of said shaft, a generator yoke on the opposite end of said shaft, a generator held in said yoke and having a driving element for engagement with the tire in the front fork, interlocking elements on the generator yoke and adjoining arm of the clamp for retaining the generator in one position while disengaged from the tire, said interlocking elements being releasable by longitudinal shifting of the shaft in one direction and a spring coiled about the rock shaft between said arms, said spring being anchored at one end to one of said arms and at the opposite end to said rock shaft, said spring being tensioned to turn the shaft in the tire engaging direction and to slide the shaft in the engaging relation of said interlocking elements, and said interlocking elements being free when released by turning of the shaft in the tire engaging relation to then permit said spring to hold the generator yieldingly engaged with the tire.

5. A bicycle light generator comprising in combination, a shaft, a laminated permanently magnetized disc rotor slidingly keyed on said shaft, stationary field poles and windings associated with said permanent magnet disc rotor, a rocking governor weight pivoted intermediate its ends on said armature shaft and connections between opposite ends of said governor weight and said slidingly mounted rotor.

6. A bicycle light generator comprising in combination, cooperating rotor and stationary field coils, a shaft on which said rotor is slidingly mounted, a spring thrusting said rotor in one direction on said shaft, a stop pin extending through said shaft and limiting the sliding movement imparted to said rotor by said spring, a pivot pin extending through said shaft, a pivotally acting centrifugally operating governor weight supported by said pivot pin and a link connected between said pivoted governor weight and rotor for sliding the latter against the force of said spring.

CARL McDERMOTT.